US008622254B2

(12) United States Patent
Kang

(10) Patent No.: US 8,622,254 B2

(45) Date of Patent: Jan. 7, 2014

(54) DISPENSING PUMP WITH RESILIENT BIASING MEMBER

(76) Inventor: Sungil Kang, Sungnam (KR)

( * ) Notice: Subject to any disclaimer, the term of this patent is extended or adjusted under 35 U.S.C. 154(b) by 128 days.

(21) Appl. No.: 13/144,533

(22) PCT Filed: Jan. 14, 2010

(86) PCT No.: PCT/KR2010/000236

§ 371 (c)(1), (2), (4) Date: Jul. 14, 2011

(87) PCT Pub. No.: WO2010/082771

PCT Pub. Date: Jul. 22, 2010

(65) Prior Publication Data

US 2011/0278328 A1 Nov. 17, 2011

(30) Foreign Application Priority Data

Jan. 14, 2009 (KR) ........................ 20-2009-0000472
Dec. 31, 2009 (KR) ........................ 20-2009-0017106

(51) Int. Cl.
*B65D 88/54* (2006.01)
*G01F 11/00* (2006.01)

(52) U.S. Cl.
USPC .................. 222/321.2; 222/321.7; 222/321.9; 222/336

(58) Field of Classification Search
USPC ......... 222/321.2, 321.7, 321.9, 336, 339–341
See application file for complete search history.

(56) References Cited

U.S. PATENT DOCUMENTS

| | | | | |
|---|---|---|---|---|
| 4,089,442 | A * | 5/1978 | Hafele et al. | 222/321.2 |
| 5,518,377 | A * | 5/1996 | Bougamont et al. | 417/446 |
| 5,687,884 | A * | 11/1997 | Bodin et al. | 222/321.7 |
| 5,704,519 | A * | 1/1998 | Crosnier et al. | 222/207 |
| 5,788,124 | A * | 8/1998 | Bougamont et al. | 222/207 |
| 6,308,865 | B1 * | 10/2001 | Lin | 222/153.13 |
| 6,390,338 | B1 * | 5/2002 | Baudin | 222/321.2 |
| 6,520,385 | B2 * | 2/2003 | Bonningue et al. | 222/336 |
| 2004/0055457 | A1 * | 3/2004 | Masuda | 92/13 |

FOREIGN PATENT DOCUMENTS

JP 06-191571 A 7/1994

OTHER PUBLICATIONS

International Search Report Mailed on Aug. 9, 2010.

* cited by examiner

*Primary Examiner* — Paul R Durand
*Assistant Examiner* — Matthew Lembo
(74) *Attorney, Agent, or Firm* — Maxon IP LLC; Justin H. Kim, Esq.

(57) ABSTRACT

A dispenser pump is mounted to an opening of a container to allow a user to dispense a cosmetic product in the container to the outside by a predetermined amount through a pumping operation. The dispenser pump allows a user to dispense contents by a predetermined amount through a cylinder (20) installed in a pump body (10*a*) by pressing a push button (40), the dispenser pump includes a pump body (10*a*) mounted to an opening of a container and to which a cylinder (20) is mounted; a cylinder (20) mounted to the pump body (10*a*); and a resilient member (30) mounted between the cylinder (20) and a working piston rod (26) and does not contact the contents to prevent hardening of the resilient member 30 and deterioration of the contents.

11 Claims, 10 Drawing Sheets

DISPENSING PUMP WITH RESILIENT BIASING MEMBER

TECHNICAL FIELD

The present invention relates to a dispenser pump mounted to an opening of a container to allow a user to dispense a cosmetic product accommodated in the container to the outside by a predetermined amount through a pumping operation, and more particularly to an improvement of a first valve which is a valve combined resilient body of Korean Utility Model No. 20-0427103 filed by the applicant. That is, the present invention relates to an improved eco-friendly dispenser pump which prevents hardening of a resilient member and deterioration of contents caused when the resilient member made of an elastomer contacts the contents while the contents are discharged through a pumping operation of a push button, and improves a problem of a conventional dispenser pump including synthetic resin components and a metallic spring by replacing a metallic spring with an elastometric spring, thereby making it possible to recycle the sources thereof.

BACKGROUND ART

In general, a dispenser pump is mounted to a container to allow a user to dispense contents, such as a cosmetic product, shampoo, and a detergent, which are contained in the container by a predetermined amount.

Various dispenser pumps mounted to a container to allow a user to dispense contents by a small amount have been conventionally suggested, and as illustrated in FIG. 1, a typical dispenser pump has a structure where an opening/closing ball 122 for opening and closing a contents introducing hole 125 and an working piston 123 are installed such that a resilient force of a spring 121 can be applied thereto, and a cylinder 120 is installed in a pump body 110 such that the contents in a contents storage chamber 126 can be dispensed when a push button 140 is pushed to apply a pressure into the contents storage chamber 126 through a working piston 123.

An air-tight piston 124 is further installed in the working piston 123, and the push button 140 is installed on an operation pipe 130 coupled to the working piston 123 of the cylinder 120.

In the conventional dispenser pump having the above-mentioned structure, if the push button 140 is pushed, after an aperture is created between the air-tight piston 124 and the working piston 123 first, the air-tight piston 124 and the working piston 123 are moved downward together, generating a pressure in the contents storage chamber 126, and the contents are dispensed through a contents feeding path 123*a* of the working piston 123 by the pressure.

Then, the opening/closing ball 122 is attached to the contents introducing hole 125 by the compressed spring 121.

As mentioned above, if an external force applied to the push button 140 is released after the contents are dispensed by pushing the push button 140, as illustrated in FIG. 2, a repulsive resilient force accumulated in the spring 121 moves the working piston 123 and the air-tight piston 124 downward together.

As the working piston 123 and the air-tight piston 124 are moved upward, the working piston 123 is initially moved upward first, thereby closing the aperture between the working piston 123 and the air-tight piston 124, blocking the contents feeding path 123*a*, and weakening the resilient force accumulated in the spring 121.

As the working piston 123 and the air-tight piston 124 continue to be moved upward with the contents feeding path 123*a* being blocked, a vacuum pressure is generated in the contents storage chamber 126 so that the opening/closing ball 122 is separated from the contents introducing hole 125 by the vacuum pressure in the contents storage chamber 126 and the contents in the container are introduced into the contents storage chamber 126 again.

The conventional dispenser pump repeats the above-mentioned operation to dispense the contents.

However, the most disadvantageous problem of the conventional dispenser pump is that since the spring is metallic and an opening/closing means for dispensing contents is a metallic ball, the metallic spring and the metallic ball may be corroded by the contents and in turn the contents may be contaminated by the metallic components.

Korean Utility Model No. 20-0427103 titled "Dispenser Pump" filed by the applicant discloses a dispenser pump which improves the above disadvantage of the conventional dispenser pump.

Although Korean Utility Model No. 20-0427103 can prevent deterioration of contents due to corrosion of components by replacing the metallic repulsive spring and the metal ball with an elastomer and employing a synthetic resin valve, the elastomer may be hardened at a portion contacting contents due to a structure where a contents dispensing hole of the elastometric member, i.e. the resilient member (first check valve) directly contact the contents, making it difficult to dispense the contents by a desired amount and lowering reliability.

Moreover, since the conventional dispenser pump includes synthetic resin components and metallic components, the used dispenser pump cannot be recycled during separation of trash and should be wasted, causing environmental problems.

Thus, the applicant has supplemented and improved the prior registered utility model.

DISCLOSURE

Technical Problem

Accordingly, the present invention has been made to solve the above-mentioned problems occurring in the prior art, and the present invention provides a dispenser pump which improves a dispenser pump of Korean Utility Model No. 20-0427103 filed by the applicant. That is, it is an object of the present invention to provide a dispenser pump which improves a configuration of a pump body and a cylinder assembled in the pump body, applies a resilient member made of an elastomer to the improved dispenser pump so that a push button performing a pumping operation can be restored to its original state by an elastometric resilient member and the elastometric resilient member cannot contact the contents, whereby an error in a pumping operation caused by loss of a flexible force of the resilient member and an irregular dispensing operation of contents can be prevented by basically preventing hardening of the resilient member by contacting the contents, and the contents can be prevented from being deteriorated when the elastometric resilient member contacts the contents.

Further, the present invention provides an eco-friendly dispenser pump where a synthetic resin valve is used instead of a metallic ball without using a metal material of a conventional dispenser pump and a metallic spring is replaced with an elastomer so that the sources of the dispenser pump can be recycled after they are used.

In addition, the present invention provides a dispenser pump where a space is formed between an outer peripheral surface of the resilient member and an inner peripheral surface of a first cylinder tube so that there is no contact surface when the resilient member is vertically pushed and resiliently reacts upward, making it possible to reduce resistance, whereby a resilient force of the resilient member becomes stronger to help smoothly perform a pumping operation and a fatigue of the resilient member becomes low to help extend a life of the resilient member.

Technical Solution

In accordance with an aspect of the present invention, there is provided a dispenser pump for allowing a user to dispense contents by a predetermined amount through a cylinder 20 installed in a pump body 10*a* by pressing a push button 40, the dispenser pump including: a pump body 10*a* mounted to an opening of a container and to which a cylinder 20 is mounted; a cylinder 20 mounted to the pump body 10*a*; and a resilient member 30 mounted between the cylinder 20 and a working piston rod 26 so as not to contact contents, wherein the contents do not contact the resilient member so that hardening of the resilient member 30 and deterioration of the contents are prevented.

A first separation preventing member 31*a* for preventing the annular fixing rim 31 from being deformed by an operation pressure of the connecting/feeding pipe 28 may be provided in the annular fixing rim 31 and a second separation preventing member 32*a* for preventing the annular connecting rim 32 from being separated from the working piston rod 26 may be provided in the annular connecting rim 32.

A space S may be formed between an outer peripheral surface of the resilient member 30 and an inner peripheral surface of a first cylinder tube 21 so that there is no contact surface when the resilient member 30 is vertically pushed and resiliently reacts upward, making it possible to reduce resistance, whereby a resilient force of the resilient member 30 becomes stronger to help smoothly perform a pumping operation and a fatigue of the resilient member becomes low to help extend a life of the resilient member 30.

Advantageous Effects

According to the present invention as described above, the dispenser pump which improves a configuration of a pump body and a cylinder assembled in the pump body, applies a resilient member made of an elastomer to the improved dispenser pump so that a push button performing a pumping operation can be restored to its original state by an elastometric resilient member and the elastometric resilient member cannot contact the contents, whereby an error in a pumping operation caused by loss of a flexible force of the resilient member and an irregular dispensing operation of contents can be prevented by basically preventing hardening of the resilient member by contacting the contents, and the contents can be prevented from being deteriorated when the elastometric resilient member contacts the contents. The dispenser pump is eco-friendly because it does not employ a metallic component, so its sources can be recycled after they are used.

BRIEF DESCRIPTION OF THE DRAWINGS

The above and other objects, features and advantages of the present invention will become more apparent from the following detailed description taken in conjunction with the accompanying drawings, in which.

DESCRIPTION OF MAIN PARTS

Figure 1:
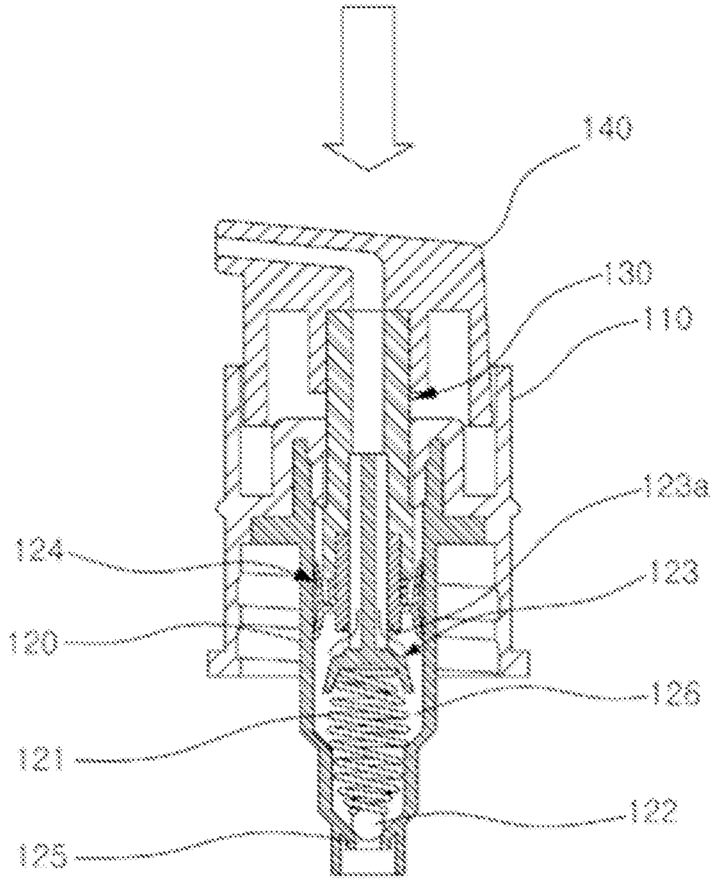
FIG. 1 PRIOR ART
FIG. 1 is an exemplary view illustrating a state of operating a conventional dispenser pump to dispense contents.
Figure 2:
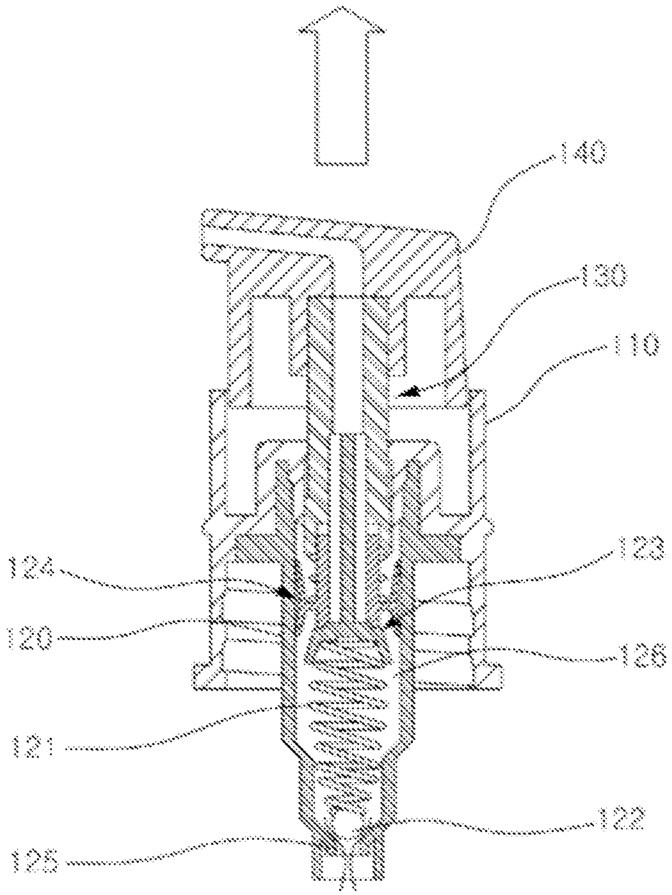
FIG. 2 PRIOR ART
FIG. 2 is an exemplary view illustrating a state of removing a force from the conventional dispenser pump to restore the dispenser pump to an original state.
Figure 3:
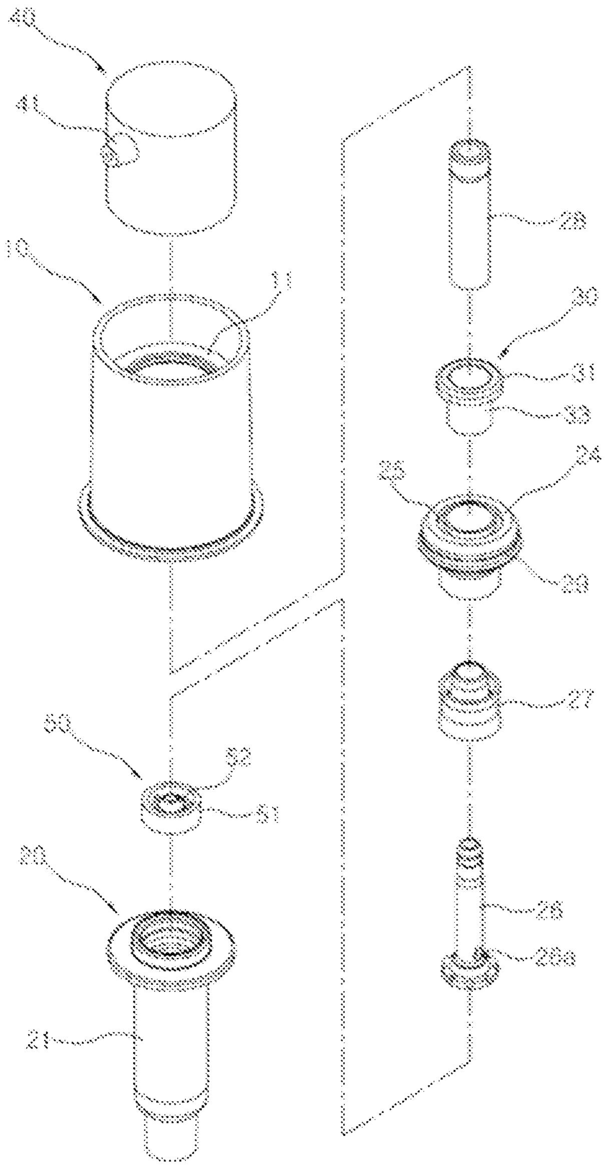
FIG. 3 is an exploded perspective view of a dispenser pump according to the present invention.
Figure 4:
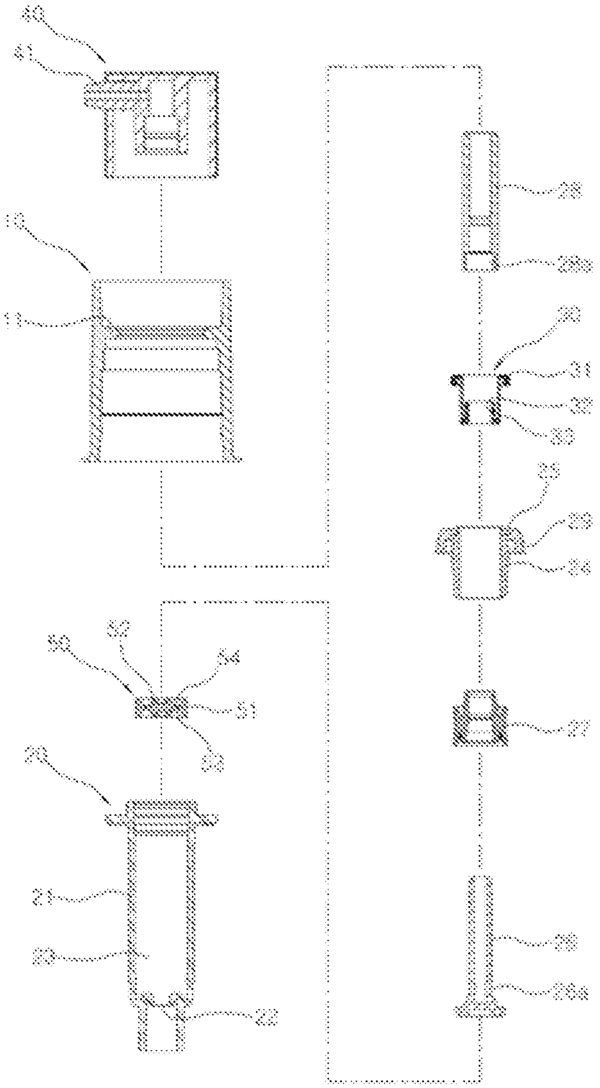
FIG. 4 is an exploded sectional view of the dispenser pump according to the present invention.

10: Pump
10*a*: Pump body
11: Annular fixing piece
20: Cylinder
21: First cylinder tube
24: Second cylinder tube
25: Insert groove
26: Working piston rod
26*a*: Feeding path
26*b*: First separation preventing engaging member
27: Air-tight piston
28: Connecting/feeding pipe
28*a*: Stepped inner surface
29: Fixing groove
30: Resilient member
31: Annular fixing rim
32: Annular connecting rim
33: Resiliently operated portion
31*a*: First separation preventing member
32*a*: Second separation preventing member
40: Push button
40*a*: Middle insert step
S: Space

MODE FOR INVENTION

The present invention is accomplished by a dispenser pump for allowing a user to dispense contents by a predetermined amount through a cylinder 20 installed in a pump body 10*a* by pressing a push button 40, the dispenser pump including:

a pump body 10*a* mounted to an opening of a container and to which a cylinder 20 is mounted; a cylinder 20 mounted to the pump body 10*a*; and a resilient member 30 mounted between the cylinder 20 and a working piston rod 26 so as not to contact contents, wherein the contents do not contact the resilient member so that hardening of the resilient member 30 and deterioration of the contents are prevented.

The terms and words used in the specification and the claims should not be construed to be limited to general or dictionary meanings, and should be construed to conform to the technical spirit of the present invention based on the principle of properly defining the concepts of the terms to explain the invention in a most suitable way.

Hereinafter, exemplary embodiments of the present invention will be described with reference to the accompanying drawings.

As illustrated in FIGS. 3 to 6, a dispenser pump adapted to dispense contents by a predetermined amount through a cylinder installed in a pump body when a push button is pushed includes: a pump body 10*a* mounted to an opening of a container and having an annular fixing piece 11 where a second cylinder tube 24 of a cylinder is mounted to an upper penetrated portion of an inner side thereof in an undercut manner; a cylinder 20 including a first cylinder tube 21 and a second cylinder tube 24, a contents introducing hole 22 of a first cylinder tube 21 being selectively opened and closed by a check valve 50 so that the contents are introduced into the contents storage chamber 23 and the working piston rod 26 including an air-tight piston 27 being installed within the contents storage chamber 23, the second cylinder tube 24 being coupled to an inner side of an upper portion of the first cylinder tube 21 and having a fixing groove 29 for fixing the second cylinder tube 24 to the annular fixing piece 11 of the pump body 10*a* in an undercut manner on an outer peripheral surface thereof; and a resilient member 30 where an annular fixing rim 31 located inside the second cylinder tube 24 and inserted and fixed into an insert groove 25 formed on an upper surface of the second cylinder tube 24 is bent outward at an upper portion thereof and an annular connecting rim 32 connected to the working piston rod 26 and located on a stepped inner surface 28*a* of the connecting/feeding pipe 28 connected to the push button having a dispensing nozzle 41 is bent inward at a lower portion thereof.

Here, if the push button 40 is pushed, the resilient member 30 is deformed by an operation of the connecting/feeding pipe 28 connected to the pump body 10*a*, and if the pushed state of the push button 40 is released, the resilient member 30 returns the connecting/feeding pipe 28 and the push button 40 to an original state by a resilient force thereof.

The check valve 50 has a rim 51 having an outer peripheral surface corresponding to an inner peripheral surface of a contents storage chamber 23 of the first cylinder tube 21, an opening/closing ball 52 for selectively opening and closing the contents introducing hole 22 is formed at a central portion of the rim 51 by the medium of a movable plate 53, and a plurality of contents passages 54 through which the contents introduced through the contents introducing hole 22 can be introduced into the contents storage chamber 23 of the first cylinder tube 21 is formed.

Here, the resilient member 30 of the present invention may be a ring-shaped resilient body made of an elastomer, i.e. a synthetic polymer (a small molecule or a huge molecule where monomers are bonded) similar to a rubber which has a (restoring) property by which it can be restored to its original shape when deformed, is strong and wear-resistant, and endures chemicals.

The material of the resilient member 30, i.e. an elastomer preferably has a large molecular weight, has a flexible polymer chain, and has a polarity and a structure whose regularities can be adjusted. Although a natural rubber or a synthetic rubber also has a certain degree of crystallinity, it is aggregated due to the characteristics and the regularity of molecules disappears even while being not deformed.

The material of the resilient member 30, i.e. an elastomer is a copolymer where a main molecular chain includes carbon atoms and may consist of other organic compounds obtained butadiene and petroleum.

The resilient member is made of an elastic polymer, such as a polysulfide rubber or a silicon rubber, where a main part of a polymer chain consists of an element other than carbon.

Meanwhile, an annular catching step extending from an peripheral portion of one end of the resiliently operated portion 33 and a tip end of which is bent outward to have a "⌈" shape is formed in the annular fixing rim 31.

Further, and an annular coupling step extending from a peripheral portion of an opposite end of the resiliently operated portion 33 and a tip end of which is bent inward to have a "⌋" shape is formed in the annular connecting rim 32.

In the above-mentioned dispenser pump of the present invention, the cylinder 20 is assembled in the annular fixing piece 11 of the pump body 10*a*.

After the check valve 50 is inserted into and assembled in the contents storage chamber 23 of the first cylinder tube 21 to allow the contents introducing hole 22 to be selectively opened and closed before the cylinder 20 is assembled in the pump body 10*a*, the working piston rod 26 where the air-tight piston 27 is assembled on an outer side thereof is located and assembled within the contents storage chamber 23 so that a feeding path 26*a* can be selectively opened and closed.

Then, the second cylinder tube 24 is assembled at an upper portion of the first cylinder tube 21 in an undercut manner.

The connecting/feeding pipe 28 is connected to the working piston rod 26 assembled in the above-mentioned manner, and the resilient member 30 is located and assembled within the second cylinder tube 24 before the connecting/feeding pipe 28 is connected.

In order to assemble the resilient member 30, the annular fixing rim 31 bent outward from the top is inserted into and fixed to the insert groove 25 formed at an upper portion of the second cylinder tube 24, and the connecting/feeding pipe 28 is inserted into and connected to the working piston rod 26 with the annular connecting rim formed at a lower portion of the resilient member 30 being inserted into the stepped inner surface 28*a* at a lower portion of the connecting/feeding pipe 28.

As mentioned above, the push button 40 is connected and mounted to the connecting/feeding pipe 28 with the working piston rod 26 being lifted by the resilient member 30, making it possible to dispense contents.

As mentioned above, the dispenser pump of the present invention constituted by assembling the pump body 10*a*, the cylinder 20, the resilient member 30, and the push button 40 is mounted to an opening of the container to allow a user to dispenser the contents accommodated within the container by a predetermined amount.

The resiliently operated portion 33 of the resilient member 30 may be an inclined ring body where a diameter of the annular connecting rim 32 is smaller than a diameter of the annular fixing rim 31.

The first separation preventing member 31*a* provided in the annular fixing rim 31 may be an annular support step protruding from an upper side of an inner surface of the annular fixing rim 31 to prevent the annular fixing rim 31 from being deformed by a frictional force with the push button 40 and expansion thereof when the piston is moved downward.

The second separation preventing member 32*a* provided in the annular connecting rim 32 may be an annular insert groove formed on an inner peripheral surface of the annular connecting rim 32 to prevent the annular connecting rim 32 from being tensioned tightly and separated by a resilient force of the resiliently operated portion 33 when the piston is moved downward.

Meanwhile, the second separation preventing member 32*a* of the annular connecting rim 32 of the present invention may be inserted into and coupled to the first separation preventing engaging member 26*b* provided on an outer surface of the working piston rod 26.

Then, the first separation preventing engaging member 26*b* may be a separation preventing annular step.

Hereinafter, the entire configuration of the dispenser pump of the present invention will be described in detail with reference to the embodiment thereof.

First, the pump 10 of the dispenser pump of the present invention generally includes the pump body 10*a* coupled to a cosmetic container, the cylinder 20 coupled to the pump body 10*a*, and the resilient member 30 having a resiliency to lift and lower the push button 40.

Here, the pump body 10*a* is mounted to the opening of the cosmetic container, and the annular fixing piece 11 to which the second cylinder tube 24 constituting the cylinder 20 is mounted in an undercut way is formed at a penetrated upper portion of an inner side thereof.

Meanwhile, the cylinder 20 coupled to the pump body 10*a* is constituted by coupling the first cylinder tube 21 and the second cylinder tube 24.

Then, the contents introducing hole 22 of the first cylinder tube 21 is selectively opened and closed by the check valve 50 so that the contents can be introduced into the contents storage chamber 23 and the working piston rod 26 including the air-tight piston 27 is installed within the contents storage chamber 23.

The fixing step 29 attached and fixed between a flange portion at an upper end of the first cylinder tube 21 and the annular fixing piece 11 of the pump body 10*a* is formed at a lower end of an outer peripheral surface of the second cylinder tube 24.

As mentioned above, the push button 40 is connected and mounted to the connecting/feeding pipe 28 with the working piston rod 256 being lifted by the resilient member 30, allowing a user to dispense the contents.

As mentioned above, the contents dispensing pump of the present invention constituted by assembling the pump body 10, the cylinder 20, the resilient member 30, and the push button 40 is mounted to the opening of a cosmetic container to allow a user to dispenser the contents accommodated in the container by a predetermined amount.

Meanwhile, the resilient member 30 of the present invention configured to lift and lower the push button may be a ring-shaped resilient body made of an elastomer, i.e. a synthetic polymer (a small molecule or a huge molecule where monomers are bonded) similar to a rubber which has a (restoring) property by which it can be restored to its original shape when deformed, is strong and wear-resistant, and endures chemicals.

The material of the resilient member 30, i.e. an elastomer preferably has a large molecular weight, has a flexible polymer chain, and has a polarity and a structure whose regularities can be adjusted.

The material of the resilient member 30, i.e. an elastomer is a copolymer whose main molecule chain consists of carbon atoms and which consists of other organic compounds obtained from butadiene and petroleum. They contain styrene and acrylonitrile.

Then, the annular fixing rim 31 of the resilient member 30 is an annular catching step extending upward from a peripheral portion of one side of the resiliently operated portion 33 and a tip end of which is bent outward to have a "⌈" shape.

The annular connecting rim 32 of the resilient member 30 is an annular coupling step extending from a peripheral portion of an opposite end of the resiliently operated portion (33) and a tip end of which is bent inward to have a "⌋" shape.

The resiliently operated portion 33 of the resilient member 30 is located inside the second cylinder tube 24 of the cylinder 20, the annular fixing rim 31 is inserted into and fixed to the annular fixing step 25 formed on an upper surface of the second cylinder tube 24, and the annular connecting rim 32 is attached and fixed to an outer surface of the working piston rod 26.

Meanwhile, the check valve 50 has a rim 51 having an outer peripheral surface corresponding to an inner peripheral surface of a contents storage chamber 23 of the first cylinder tube 21, an opening/closing ball 52 for selectively opening and closing the contents introducing hole 22 is formed at a central portion of the rim 51 by the medium of a movable plate 53, and a plurality of contents passages 54 through which the contents introduced through the contents introducing hole 22 can be introduced into the contents storage chamber 23 of the first cylinder tube 21 is formed.

In the above-mentioned dispenser pump of the present invention, the cylinder 20 is assembled in the annular fixing piece 11 of the pump body 10*a*.

After the check valve 50 is inserted into and assembled in the contents storage chamber 23 of the first cylinder tube 21 to allow the contents introducing hole 22 to be selectively opened and closed before the cylinder 20 is assembled in the pump body 10*a*, the working piston rod 26 where the air-tight piston 27 is assembled on an outer side thereof is located and assembled within the contents storage chamber 23 so that a feeding path 26*a* can be selectively opened and closed.

Then, the second cylinder tube 24 is assembled at an upper portion of the first cylinder tube 21 in an undercut manner.

The connecting/feeding pipe 28 is connected to the working piston rod 26 assembled in the above-mentioned manner, and the resilient member 30 is located and assembled within the second cylinder tube 24 before the connecting/feeding pipe 28 is connected.

In order to assemble the resilient member 30, the annular fixing rim 31 bent outward from the top is inserted into and fixed to the insert groove 25 formed at an upper portion of the second cylinder tube 24, and the connecting/feeding pipe 28 is inserted into and connected to the working piston rod 26 with the annular connecting rim formed at a lower portion of the resilient member 30 being inserted into the stepped inner surface 28*a* at a lower portion of the connecting/feeding pipe.

Figure 7:
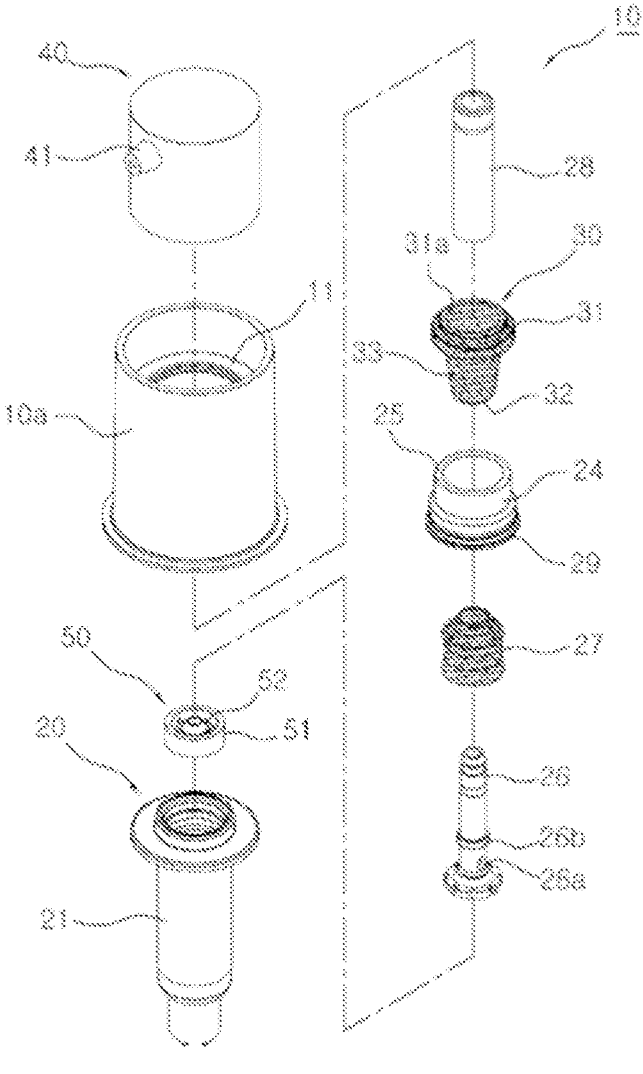
FIG. 7 is an exploded perspective view illustrating another embodiment of the present invention.
Figure 8:
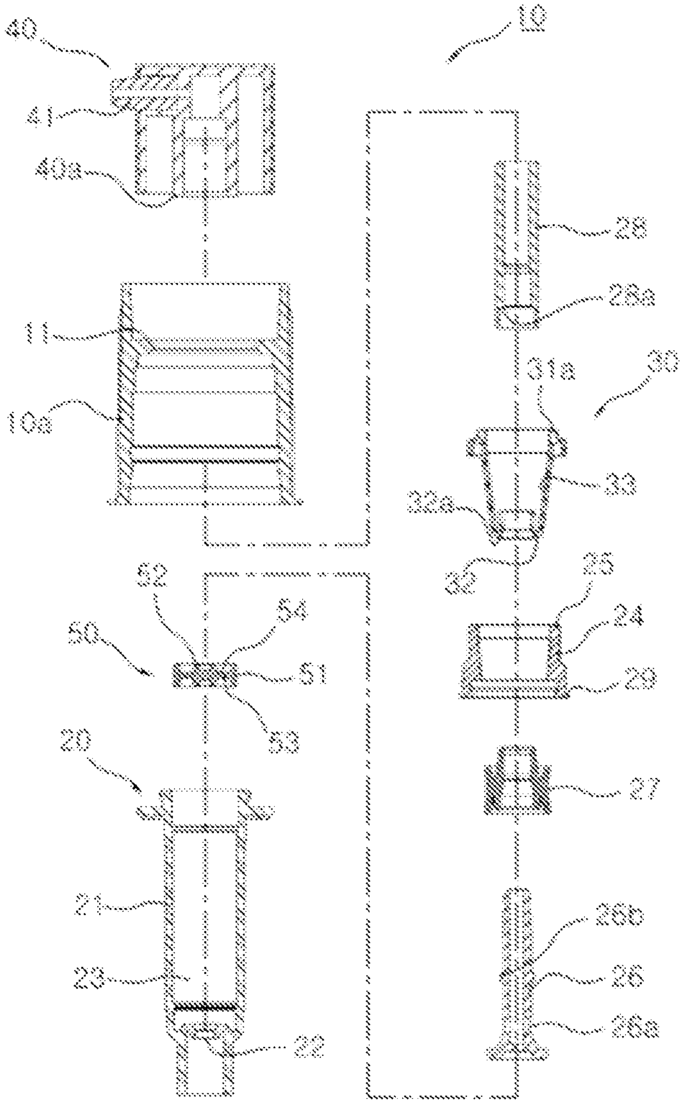
FIG. 8 is an exploded sectional view of the dispenser pump of FIG. 7.
Figure 9:
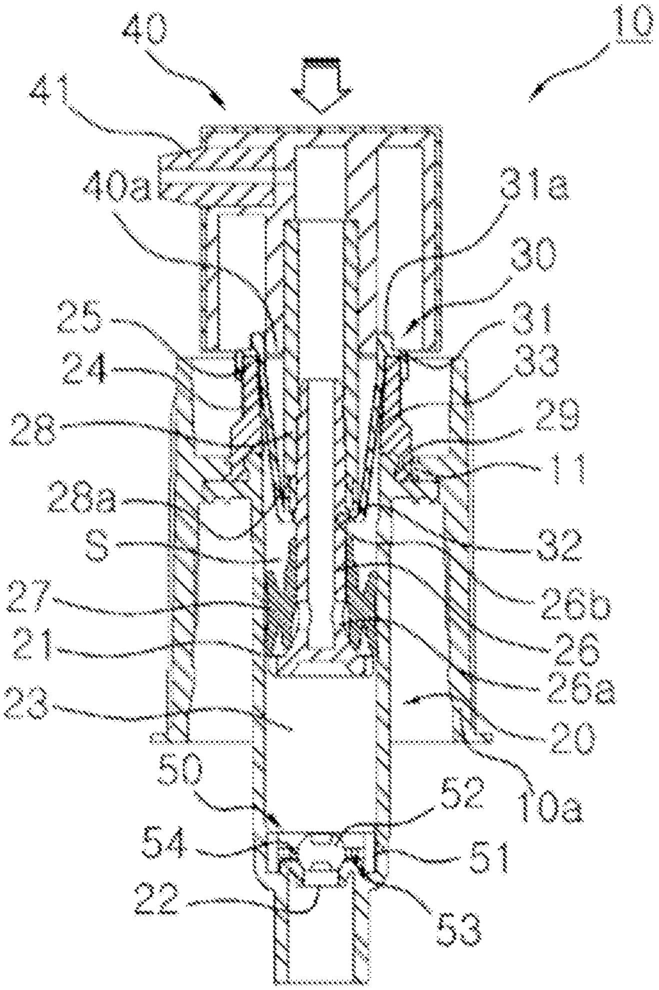
FIG. 9 is a sectional view of the dispenser pump of FIG. 7, wherein a state shortly before a push button is operated is exemplified.
Figure 10:
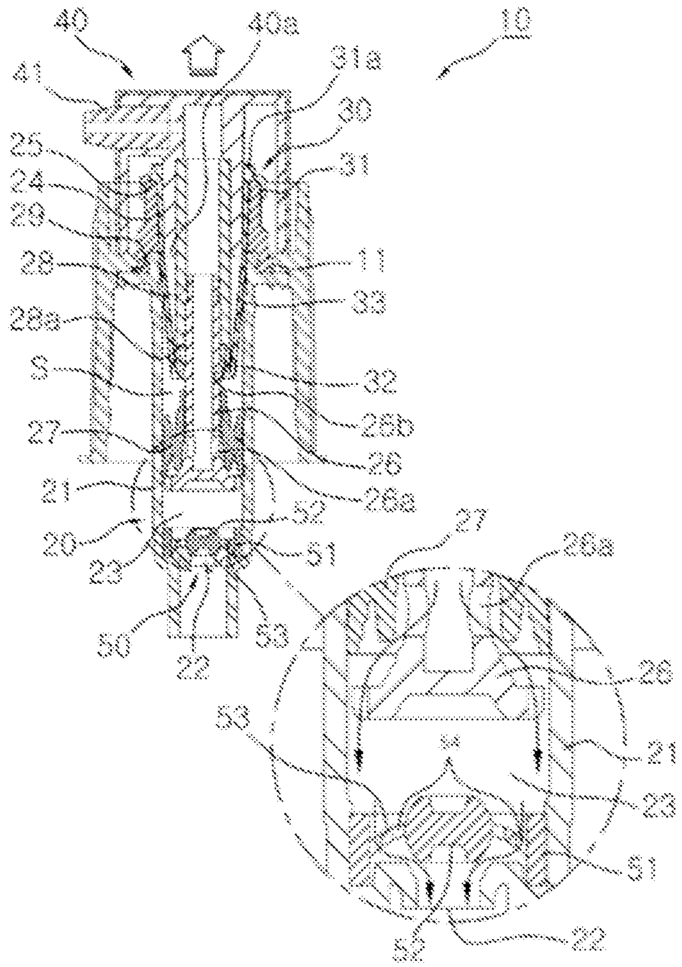
FIG. 10 is a sectional view of the dispenser pump of FIG. 7, wherein a state of removing a force from the push button to restore the dispenser pump to an original state is exemplified.

As another embodiment of the present invention, as illustrated in FIGS. 7 to 9, the resiliently operated portion 33 of the resilient member 30 may be an inclined ring body where a diameter of the annular connecting rim 32 is smaller than a diameter of the annular fixing rim 31.

The first separation preventing member 31*a* provided in the annular fixing rim 31 may be an annular support step protruding from an upper side of an inner surface of the annular fixing rim 31 to prevent the annular fixing rim 31 from being deformed by a frictional force with the push button 40 and expansion thereof when the piston is moved downward.

The second separation preventing member 32*a* provided in the annular connecting rim 32 may be an annular insert groove formed on an inner peripheral surface of the annular connecting rim 32 to prevent the annular connecting rim 32 from being tensioned tightly and separated by a resilient force of the resiliently operated portion 33 when the piston is moved downward.

The resiliently operated portion 33 of the resilient member 30 is located inside the second cylinder tube 24 of the cylinder 20, the annular fixing rim 31 is inserted into and fixed to the annular fixing step 25 formed on an upper surface of the second cylinder tube 24, and the separation preventing annular step 26*a* and the separation preventing member 32*a* of the annular connecting rim 32 are attached and fixed to an outer surface of the working piston rod 26.

Here, when the annular fixing rim 31 is inserted into and fixed to the annular fixing step 25 of the second cylinder tube 24, the first separation preventing member 31*a* formed at an upper portion of the annular fixing rim 31 is located to correspond to an outer surface of a middle insert step 40*a* into which the connecting/feeding pipe 28 of the push button 40 is inserted and fixed.

Then, the annular fixing rim 31 is prevented from being separated from the annular fixing step 25 of the second cylinder tube 24 and deformed in the process of lowering the push button 40, the connecting/feeding pipe 28, and the working piston rod 26, and extending the resilient member 30.

That is, when the resiliently operated portion 33 of the resilient member 30 is extended and pulled, the annular fixing rim 31 will be deviated from the annular fixing step 25 and pulled toward the resiliently operated portion 33 without the first separation preventing member 31*a*, but since the first separation preventing member 31*a* protrudes to be caught by the middle insert step 40*a* of the push button 40 and be blocked, making it possible to prevent separation and deformation.

In another coupling structure of the present invention, when the connecting/feeding pipe 28 is inserted into and coupled to the working piston rod 26 with the annular connecting rim 32 being inserted into the stepped inner surface 28*a* of a lower portion of the connecting/feeding pipe 28, the second separation preventing member 32*a* provided in the annular connecting rim 32 is inserted into and attached to the first separation preventing engaging member 26*b* provided in the working piston rod 26.

By doing this, an attractive force of the resiliently operated portion 33 prevents the annular connecting rim 32 from being separated between the working piston rod 26 and the connecting/feeding pipe 28 in the process of extending the resilient member 30.

Meanwhile, a space S is formed between an outer peripheral surface of the resilient member 30 and an inner peripheral surface of a first cylinder tube 21 so that there is no contact surface when the resilient member 30 is vertically pushed and resiliently reacts upward, making it possible to reduce resistance, whereby a resilient force of the resilient member 30 becomes stronger to help smoothly perform a pumping operation and a fatigue of the resilient member becomes low to help extend a life of the resilient member 30.

As mentioned above, the push button 40 is connected and mounted to the connecting/feeding pipe 28 with the working piston rod 26 being supported by the resilient member 30 and lifted, making it possible to dispense contents.

Further, as mentioned above, the dispenser pump of the present invention constituted by assembling the pump body 10*a*, the cylinder 20, the resilient member 30, and the push button 40 is mounted to an opening of a cosmetic container, allowing a user to dispense the contents accommodated in the cosmetic container by a predetermined amount.

Hereinafter, a process of dispensing cosmetic contents according to the present invention will be described with reference to the accompanying drawings.

Figure 5:
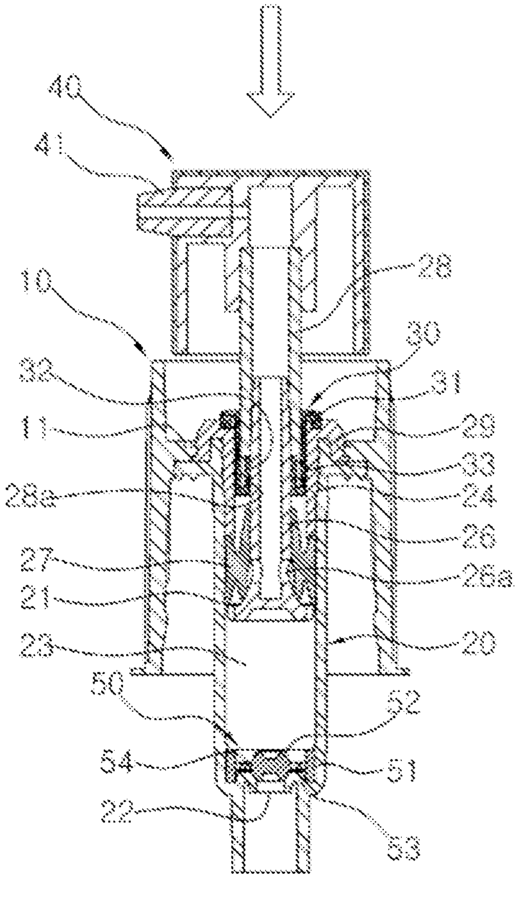
FIG. 5 is a sectional view of the dispenser pump according to the present invention, wherein a state shortly before a push button is operated is exemplified.

FIG. 5 illustrates a state before the push button 40 is operated, wherein if the push button 40 is pushed, the working piston rod 26 starts to be moved downward by a tensile force of the resiliently operated portion 33 of the resilient member 30.

Figure 6:
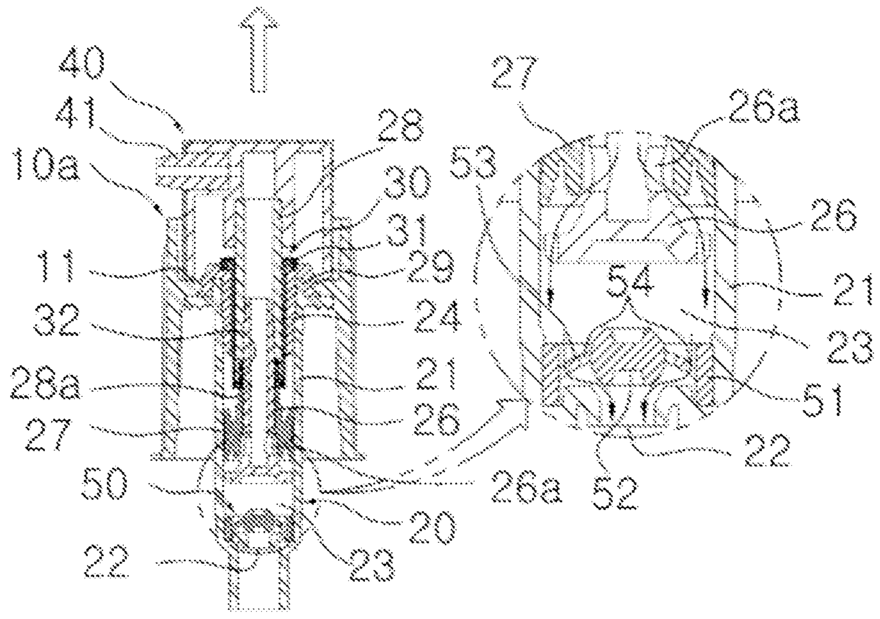
FIG. 6 is a sectional view of the dispenser pump according to the present invention, wherein a state of removing a force from the push button to restore the dispenser pump to an original state is exemplified.

The feeding path 26*a* initially blocked by the air-tight piston 27 as illustrated in FIG. 5 is opened as illustrated in FIG. 6 by the working piston rod 26 moved downward.

With the feeding path 26*a* being opened, the air-tight piston is supported by the annular connecting rim 32 at a lower end of the resilient member 30 and starts to be moved together with the working piston rod 26.

If the working piston rod 26 is moved downward further with the feeding path 26*a* being opened, the contents introduced into the contents storage chamber 23 of the first cylinder tube 21 are compressed and the compressed contents are introduced into the connecting/feeding pipe 28 via the feeding path 26*a*, allowing the contents in the connecting/feeding pipe 28 to be dispensed through the dispensing nozzle 41.

When the contents are dispensed, the opening/closing ball 52 of the check valve 50 is attached to the contents introducing hole 22 as illustrated in FIG. 5.

FIG. 6 illustrates a state where an external force applied to the push button 40 is removed, wherein the push button 40 is restored to its original position by a tensile force of the resiliently operated portion 33 of the resilient member 30.

The working piston rod 26 is moved upward in conjunction with the push button 40 moved upward by the resilient member 30, and when the working piston rod 26 is moved upward, the feeding path 26*a* is blocked by the air-tight piston 27 to generate a vacuum pressure within the contents storage chamber 23 of the first cylinder tube 21, in which case as a vacuum pressure is generated in the contents storage chamber 23, the opening/closing ball 52 of the check valve 50 blocking the contents introducing hole 22 is spaced apart from the contents introducing hole 22, making it possible to fill the contents storage chamber 23 with the contents accommodated in the container.

As described above, according to the present invention, contents can be continuously dispensed by an operation of the push button 40 for performing a pumping operation repeatedly and continuously by a resilient tensile force of the resilient member 30.

Although several preferred embodiments of the present invention have been described for illustrative purposes, those skilled in the art will appreciate that various modifications, additions and substitutions are possible, without departing from the scope and spirit of the invention in the widest form as disclosed in the accompanying claims.

INDUSTRIAL APPLICABILITY

A dispenser pump is mounted to a container as a means of dispensing contents such as a cosmetic product, shampoo, and a detergent contained in the container by a predetermined amount.

The invention claimed is:

1. A dispenser pump for allowing a user to dispense contents by a predetermined amount by pressing a push button (40), the dispenser pump comprising:

a pump body (10*a*) mounted to an opening of a container;

a cylinder (20) mounted to the pump body (10*a*);

a second cylinder tube (24);

a connecting/feeding pipe (28) disposed at least partially within the second cylinder tube (24);

a working piston rod (26) disposed at least partially within the connecting/feed tube (28); and;

a resilient member (30) mounted between the cylinder (20) and the working piston rod (26) wherein the contents do not contact the resilient member throughout the process of dispensing the resilient member (30) having an annular catching step extending radially outward from an peripheral portion of one end thereof, the annular catching step having a tip end to fit in an insert groove formed on an upper surface of the second cylinder tube (24), the resilient member (30) also having an annular coupling step extending radially inward from a peripheral portion at an opposite end thereof and having a tip end to fit in a stepped inner surface of the connecting/feeding pipe (28).

2. The dispenser pump as claimed in claim 1, wherein the cylinder (20) includes a first cylinder tube (21) and has the second cylinder tube (24) inserted therein.

3. The dispenser pump as claimed in claim 1, wherein the resilient member (30) includes a resiliently operated portion (33) whose shape is deformed by an operation of a connecting/feeding pipe (28) mounted to the pump (10) if the push button (40) is pushed and which restores the connecting/feeding pipe (28) and the push button (40) to an original position when the push button (40) is released, the resiliently operated portion (33) fixed outside of a contents dispensing path; and wherein a space (S) is formed between an outer peripheral surface of the resilient member (30) and an inner peripheral surface of a first cylinder tube (21) so that there is no contact surface when the resilient member (30) is vertically pushed and resiliently reacts upward, making it possible to reduce resistance, whereby a resilient force of the resilient member (30) becomes stronger to help smoothly perform a pumping operation and a fatigue of the resilient member becomes low to help extend a life of the resilient member (30).

4. The dispenser pump as claimed in claim 3, wherein the resiliently operated portion (33) has a first separation preventing member (31*a*) on an annular fixing rim (31) and a second separation preventing member (32*a*) on an annular connecting rim (32).

5. The dispenser pump as claimed in claim 1, wherein the pump body (10*a*), the cylinder (20), the resilient member (30), and a check valve (50) are made of a synthetic resin to be recycled in an eco-friendly manner.

6. The dispenser pump as claimed in claim 1, wherein the resilient member (30) is made of an elastomer which is a synthetic polymer material and is apt to be restored to an original shape thereof when deformed, whereby the resilient member (30) has an excellent resiliency and can be recycled.

7. The dispenser pump as claimed in claim 1, wherein the resilient member is made of an elastic polymer, such as a polysulfide rubber or a silicon rubber, where a main part of a polymer chain consists of an element other than carbon.

8. The dispenser pump as claimed in claim 1, wherein an annular fixing piece (11) is formed on an inner side of the pump body (10*a*), a fixing groove (29) is formed on an outer peripheral surface of an upper portion of the second cylinder tube (24), and the fixing groove (29) of the second cylinder tube (24) is coupled to the annular fixing piece (11) of the pump body (10*a*) so that the cylinder including the second cylinder tube (24) is coupled to the pump body (10*a*).

9. The dispenser pump as claimed in claim 1, wherein a contents introducing hole (22) of a first cylinder tube (21) is selectively opened and closed by a check valve (50) so that the contents are introduced into a contents storage chamber (23) and the working piston rod (26) including an air-tight piston (27) is installed within the contents storage chamber (23).

10. The dispenser pump as claimed in claim 9, wherein a rim (51) having an outer peripheral surface corresponding to an inner peripheral surface of the contents storage chamber (23) of the first cylinder tube (21) is formed in the check valve (50), an opening/closing ball (52) for selectively opening and closing the contents introducing hole (22) is formed at a center of the rim (51), and a plurality of contents passages (54) are formed such that the contents introduced through the contents introducing hole (22) are introduced into the contents storage chamber (23).

11. The dispenser pump as claimed in claim 1, wherein the first separation preventing member (31*a*) is an annular support step protruding from an upper side of an inner surface of the annular fixing rim (31) to prevent the annular fixing rim (31) from being deformed by a frictional force with the push button (40) or an expansion thereof when the piston is moved downward, and the second separation preventing member (32*a*) is an annular insert groove formed on an inner peripheral surface of the annular connecting rim (32) to prevent the annular connecting rim (32) from being separated while being tensioned tightly by a resilient force of the resiliently operated portion (33) when the working piston rod (26) is moved downward.

* * * * *